Nov. 11, 1930.  B. G. DUNHAM  1,780,910
TESTING SYSTEM
Filed June 30, 1928  6 Sheets-Sheet 2

INVENTOR:
BERT G. DUNHAM
BY
ATTORNEY

Nov. 11, 1930.   B. G. DUNHAM   1,780,910
TESTING SYSTEM
Filed June 30, 1928     6 Sheets-Sheet 4

INVENTOR:
BERT G. DUNHAM
BY
ATTORNEY

Nov. 11, 1930.  B. G. DUNHAM  1,780,910
TESTING SYSTEM
Filed June 30, 1928  6 Sheets-Sheet 5

INVENTOR:
BERT G. DUNHAM
BY
ATTORNEY

Nov. 11, 1930.  B. G. DUNHAM  1,780,910
TESTING SYSTEM
Filed June 30, 1928  6 Sheets-Sheet 6
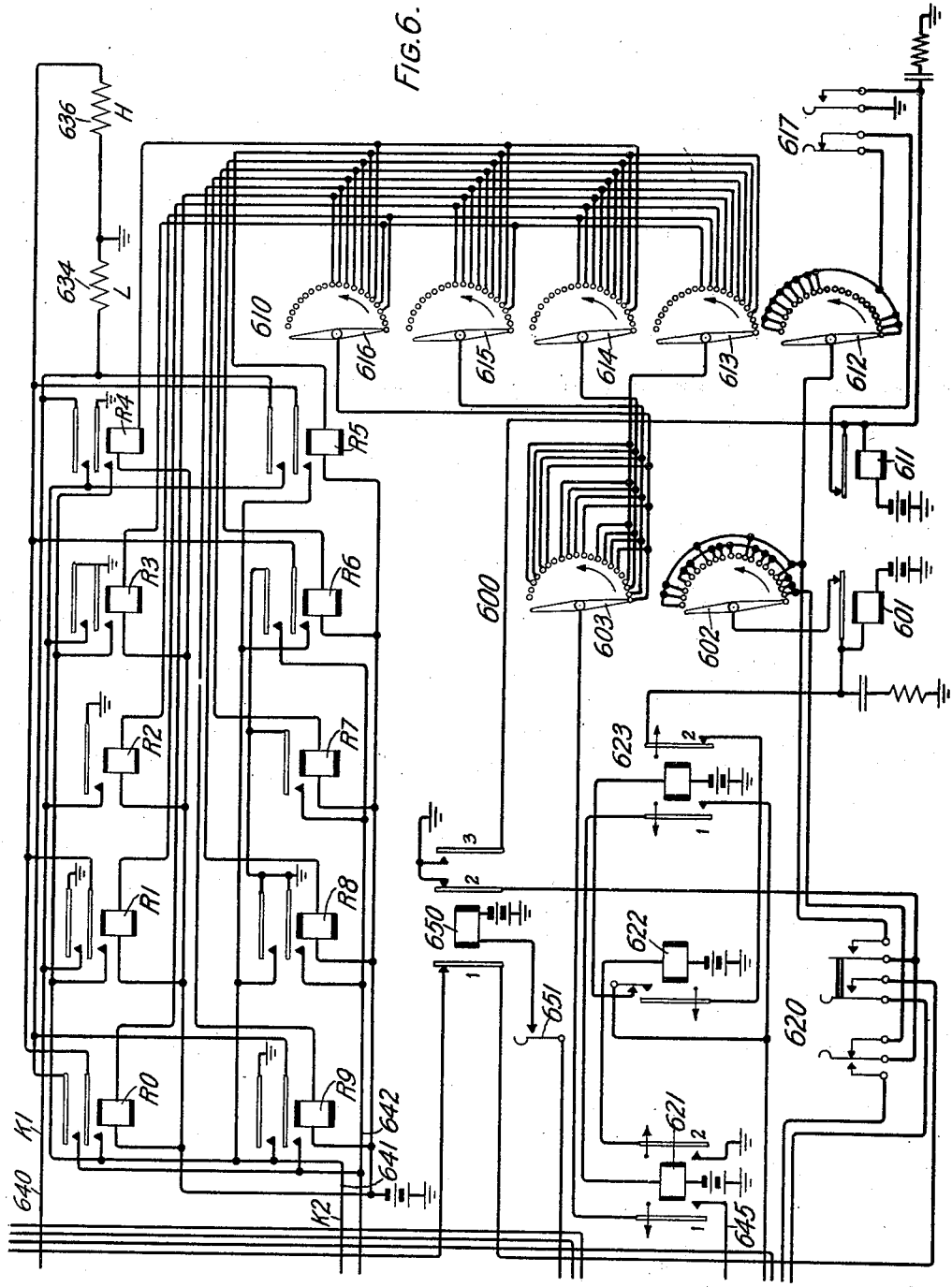
FIG.6.
INVENTOR:
BERT G. DUNHAM
BY
ATTORNEY Patented Nov. 11, 1930

1,780,910

UNITED STATES PATENT OFFICE

BERT G. DUNHAM, OF HAWTHORNE, NEW JERSEY, ASSIGNOR TO BELL TELEPHONE LABORATORIES, INCORPORATED, OF NEW YORK, N. Y., A CORPORATION OF NEW YORK

TESTING SYSTEM

Application filed June 30, 1928. Serial No. 289,390.

The present invention relates to a testing system in a machine switching telephone office. More specifically, it relates to a system for testing the responsive action of sender registers to signals transmitted thereto by electrically operable register setting apparatus.

The object of this invention is to provide devices for simplifying automatically operable circuit arrangements for testing impulse producing senders.

One embodiment of the present invention comprises an automatically operable register setting device for variably positioning sender registers for the transmission of impulses. This register setting device comprises a group of selectable relays which may be individually operated for establishing electrical connections with any registers associated therewith. An automatically progressive switch is rotated as the registers are operated for consecutively operating a plurality of these relays. The registers of a sender may thus be set in any desired manner for transmitting impulses to represent any desired combination of digits.

Another embodiment of the present invention comprises signaling devices having switches operable in accordance with the impulses transmitted by the sender in response to the action of the register setting device. The switches operated by the sender have brushes movable in two directions and terminals strapped in primary and secondary ordinates. One brush of the switch is associated with the terminals of a primary ordinate and a second brush of the switch is associated with the terminals of a secondary ordinate. Signaling apparatus is associated with the switch terminals for indicating the position taken by the switch brushes, one signal being common to each group of ordinates.

This invention has been illustrated in the accompanying drawing in which:

Figs. 1 and 3 show a group of four registers A, B, C and D which correspond in their operation to the registers of a sender;

Fig. 5 includes auxiliary relays operated in conjunction with the register relays of Figs. 1 and 3. A diagrammatic embodiment of a sender to be tested and a switch for selecting senders to be tested are also included in this figure.

Fig. 6 shows a group of ten relays for controlling the sender and testing circuit registers and step-by-step switches for selecting combinations of these relays;

Fig. 7 shows the arrangement of the drawings forming a part of this specification.

The testing arrangement illustrated herein is arranged for testing the sender disclosed in Patent 1,619,250 issued to me March 1, 1927. Only sufficient detailed operation of this sender will be given in this specification to complete the circuit paths established by the testing circuit. It is believed unnecessary to give further detailed explanation of the sender since this may be obtained by referring to the description in the patent.

Figure 3:
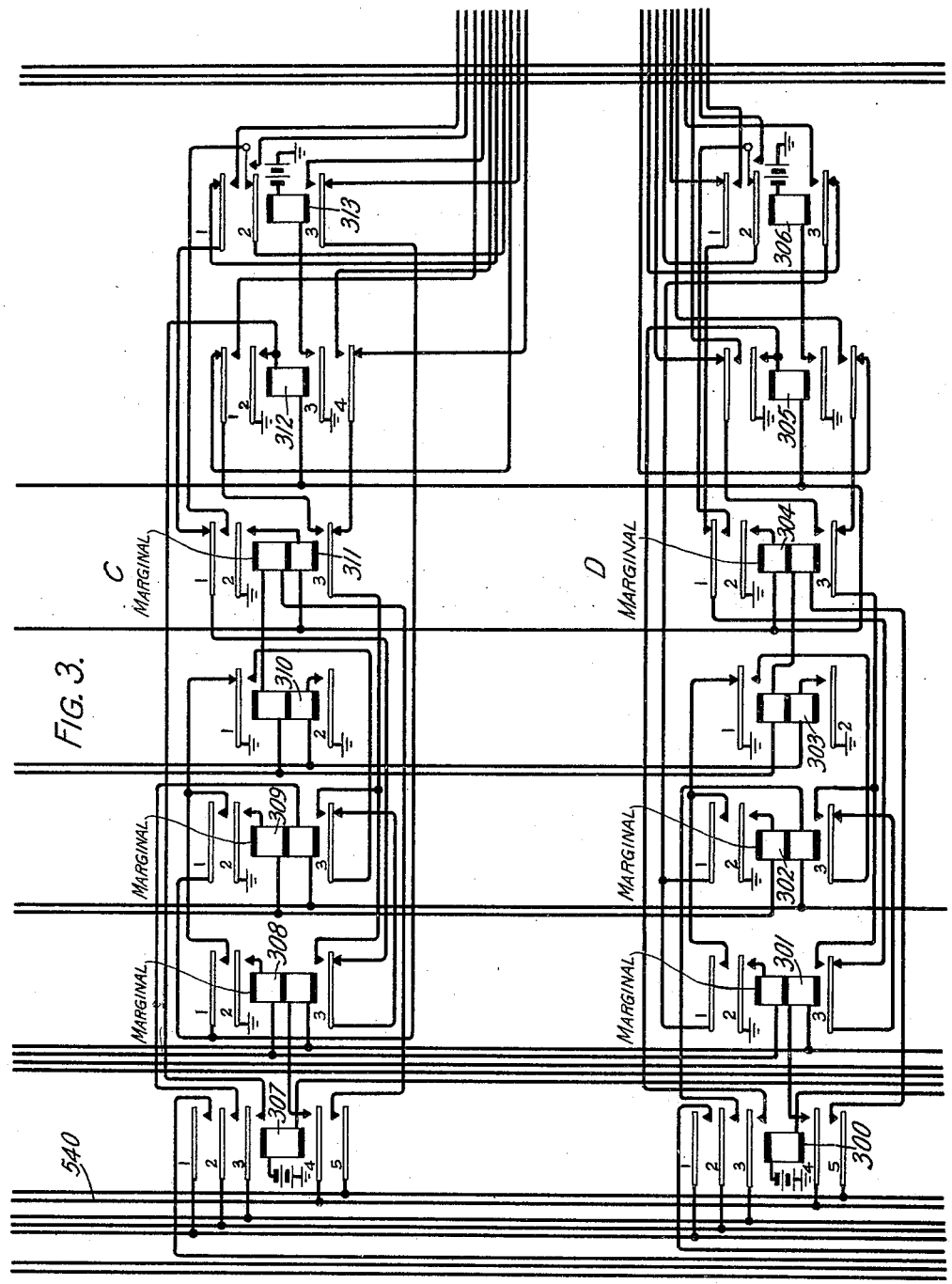
Figure 4:
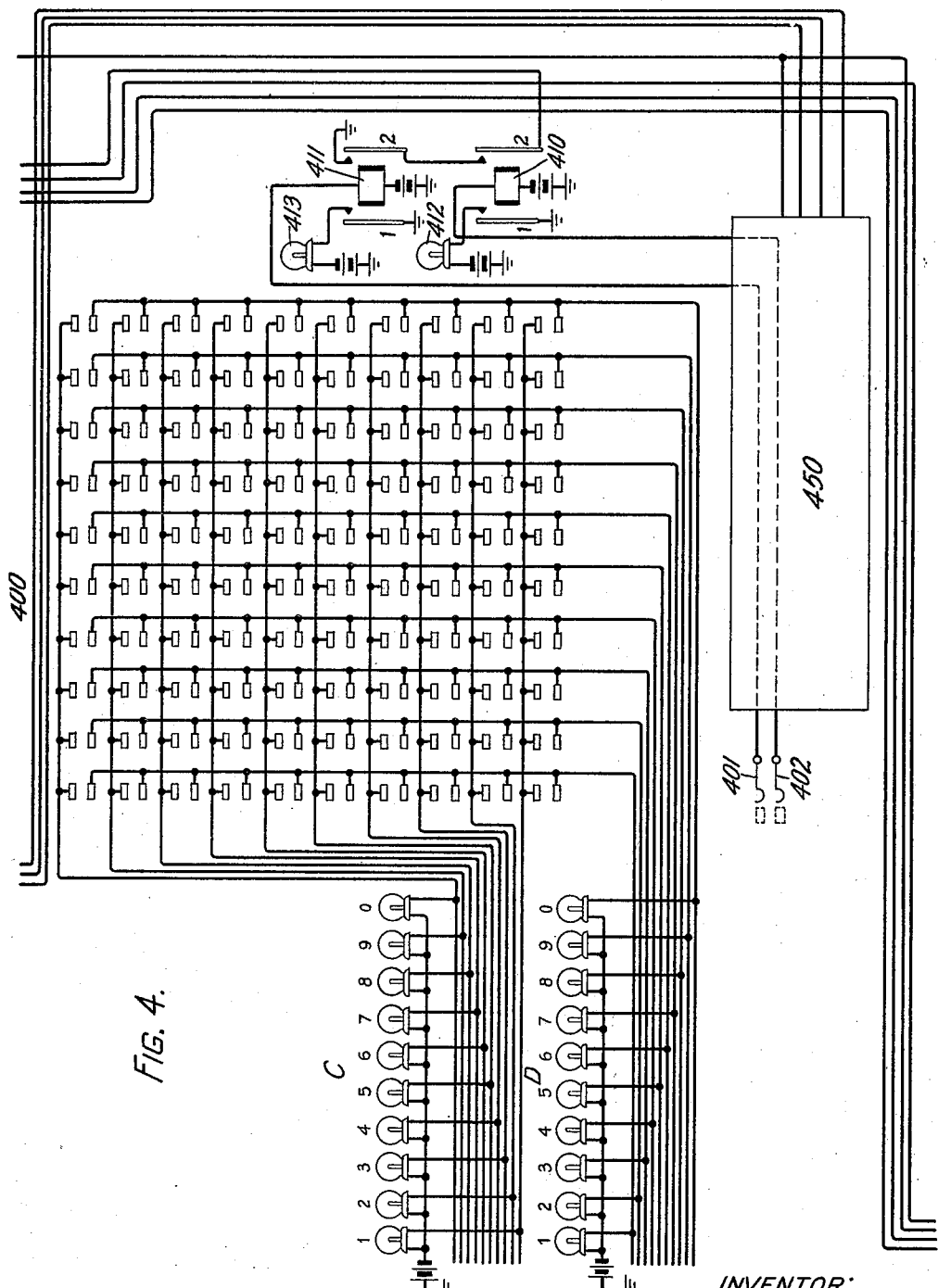

The ten relays $R^1$ to $R^0$ in combination with switches 600 and 610 and relays 621, 622 and 623 are arranged to duplicate automatically any combination of sender register control that may be accomplished by the operation of the register control keys shown in Fig. 3 of the foregoing Patent 1,619,250. The contacts of the relays replace the contacts of the keys for establishing circuits including or excluding resistances 634 or 636 for operating the sender registers. Switch 610 is progressively operated to select various combinations of the register control relays $R^1$ and $R^0$ and switch 600 is operated to progressively operate the register control relays selected in each position of switch 610. The circuits established through the contacts of the register control relays are not only associated with the sender registers but are associated with the testing circuit registers shown in Figs. 1 and 3. The testing circuit registers are operated in the same manner as the sender registers in order to operate the signals in groups A, B, C and D and to mark terminals in terminal banks 200 and 400. It will be noted in the detailed description of this testing circuit that certain of the circuits established from the contacts of the register control relays to the sender registers are extended through the windings of the testing circuit register relays. The windings of these relays through which the circuits are extended replace the retardation coils 360 and 361 shown in Fig. 3 of my aforementioned patent.

As many of the register control relays may be consecutively operated as are necessary to test the registers of a sender. In this disclosure only four of the relays are consecutively operated for each test which causes the sender to transmit impulses for four digits to the switching apparatus 250 and 450. One lamp in each group A, B, C and D is lighted in accordance with the testing circuit register settings. The terminal ordinate with which each brush should be associated in response to the operation of the sender is thus indicated to an attendant. If the impulses are transmitted by the sender in accordance with the register control relays operated, lamps 213, 212, 413 and 412 are lighted to indicate that the test initiated has been satisfactorily completed. A circuit is established through the contacts of relays 210, 211, 410 and 411 for operating relays to advance the testing circuit for the operation of other register control relays and consequently a different operation of the sender.

Detailed description

Figure 5:
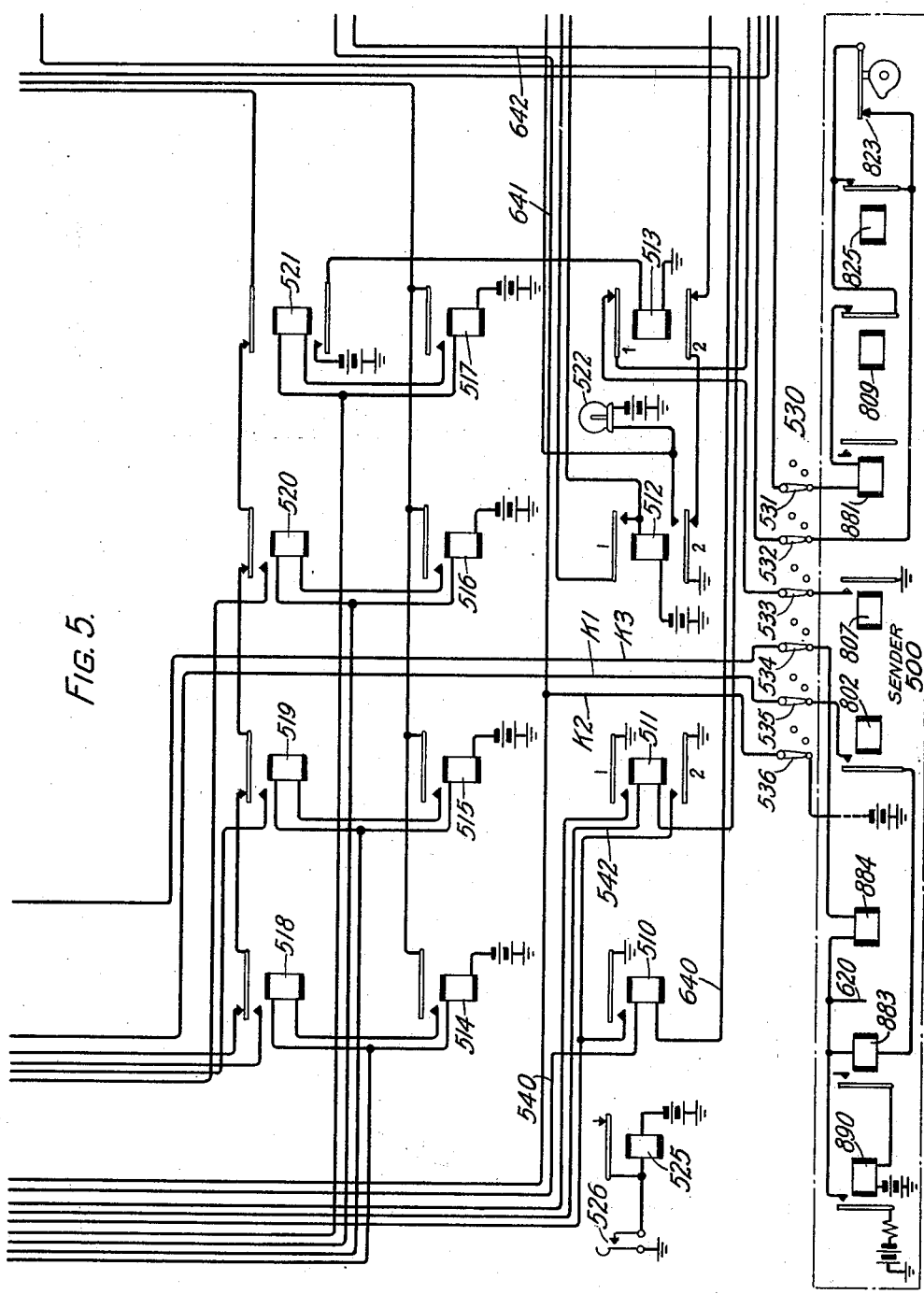

Key 620 is operated to start the operation of this testing circuit. Let it be assumed that switch 530 is associated with the first sender to be tested. The operation of key 620 associates ground with the winding of relay 114 for operating said relay. The operation of relay 114 connects battery and ground to the contacts of register relays, Figs. 1 and 2, and to the switching relays, Fig. 5. Only one circuit is however completed at this time which operates relay 107 for connecting the relays of register A with the control relays, Fig. 6. This circuit may be traced from ground, through the fifth contact of relay 114, upper contacts of relays 521, 520, 519 and 518 to battery, through the winding of relay 107. A circuit is also established by the operation of key 620 to rotate switch 610 to the fourth terminal position. This circuit may be traced from ground through the normal contact 2 of relay 650, right outer contact of key 620, brush 612 and associated contacts, left contact of key 617, contact and winding of magnet 611 to battery. The first three terminals associated with brush 612 are strapped in order to cause the energization and deenergization of magnet 611 until the fourth terminal position is reached. The brushes 613 to 616, inclusive, are thus associated with certain of the register control relays $R^0$ to $R^9$. The pulsing circuit between the sender and switch 250 is established through the right inner contact of key 620 which may be traced from battery through the left winding of relay 220, normal contacts 3 of relay 229, brush 532 and its associated contact, normal contacts of relays 825 and 809, winding of relay 881, brush 531 and its associated contact, right inner contact of key 620, normal contact of relay 650, fourth normal contact of relay 229 to ground through the right winding of relay 220. Relays 220 and 881 are operated in the circuit traced. The operation of relay 220 establishes an energizing circuit for relay 227 from battery through its winding, contact of relay 220 to ground through the normal contact 5 of relay 229. Relays 220 and 227 remain operated awaiting the pulses from the sender.

Referring to the sender, Patent 1,619,250, Fig. 8 and the description thereof, it will be noted that the operation of relay 881 establishes an operating circuit for relay 882, that the operation of relay 882 establishes an operating circuit for relay 803, that the operation of relay 803 establishes an operating circuit for relay 807 and that the operation of relay 807 establishes an operating circuit for relay 802. The operation of relay 807 connects ground to brush 533 and its associated contact, normal contact 1 of relay 513, normal contact of relay 622, winding of relay 623 to battery. The operation of relay 623 associates the ground from the contact of relay 807 through the winding of relay 621 to battery and the operation of relay 621 establishes an obvious operating circuit for relay 622. The operation of relay 622 opens the original operating circuit for relay 623. It will be noted that relays 621, 622 and 623 are slow-releasing relays. During the time that these relays remain operated certain functions are accomplished. The operation of relay 621 establishes a circuit for the operation of a register control relay, which circuit may be traced from ground through the normal contact 2 of relay 512, normal contact 2 of relay 513, contact 1 of relay 621, brush 603 and its associated contact in position 1, brush 616 and its associated contact in position 4, winding of relay $R^2$ to battery. Relay $R^2$ controls the operation of register relays, Fig. 1, in the testing circuit and register relays in the sender, which will be described later. Relay 623 releases before relay 622. During the time that relay 622 is operated, a circuit is established to advance switch 600 to the next terminal position. This circuit extends from ground at the contact of relay 807 to the contact of relay 622 as previously traced, through the normal contact 2 of relay 623, which is established upon the release of relay 623, winding of magnet 601 to battery. This magnet is not released to advance brushes 602 and 603 to position 2 until relay 622 releases and therefore the circuit for relay R² through contact 1 of relay 621 remains established until the relay 621 releases. Upon the release of relays 621 and 622, the circuit through the switch magnet 601 is opened, permitting the brushes 602 and 603 to advance one terminal position, and the circuit for relay R² is opened to cause its release.

During the period of time that relay R² is operated, ground is connected through its contact to conductor 640, winding of relay 510, fourth contact of relay 107, lower winding of relay 108, brush 535 and its associated contact, contact of relay 802, winding of relay 883, conductor 620 and thence to battery through the left winding of relay 613, as shown and described in the aforementioned Patent 1,619,250. The register relay 613 in the sender and the register relay 108 in the testing circuit are operated and relay 510 are operated in the circuit traced. The register relay 108 is locked in position from ground through its contact 2 and upper winding to battery at contact 3 of relay 114. The operation of relay 510 establishes a circuit through contact 1 of relay 107 for operating relay 514. A circuit is thus established through the winding of relay 518 to ground at contact 4 of relay 114. This circuit is, however, not effective until the ground shunt from the contact of relay 510 is removed. This ground shunt is removed by the release of relay 510 upon the release of relays 621 and R². The circuit for relay R² is opened at contact 1 of relay 621. Relay 518 is now permitted to operate in series with relay 514. The operation of relay 518 disassociates ground from the winding of relay 107 to cause its release and associates ground with the winding of relay 100 to cause the operation of the latter relay.

By referring to Patent 1,619,250 it will be noted that a similar transfer from one register to another also takes place in the sender responsive to the setting of each register. The first transfer is made by releasing relay 600 and operating relay 700.

Figure 1:
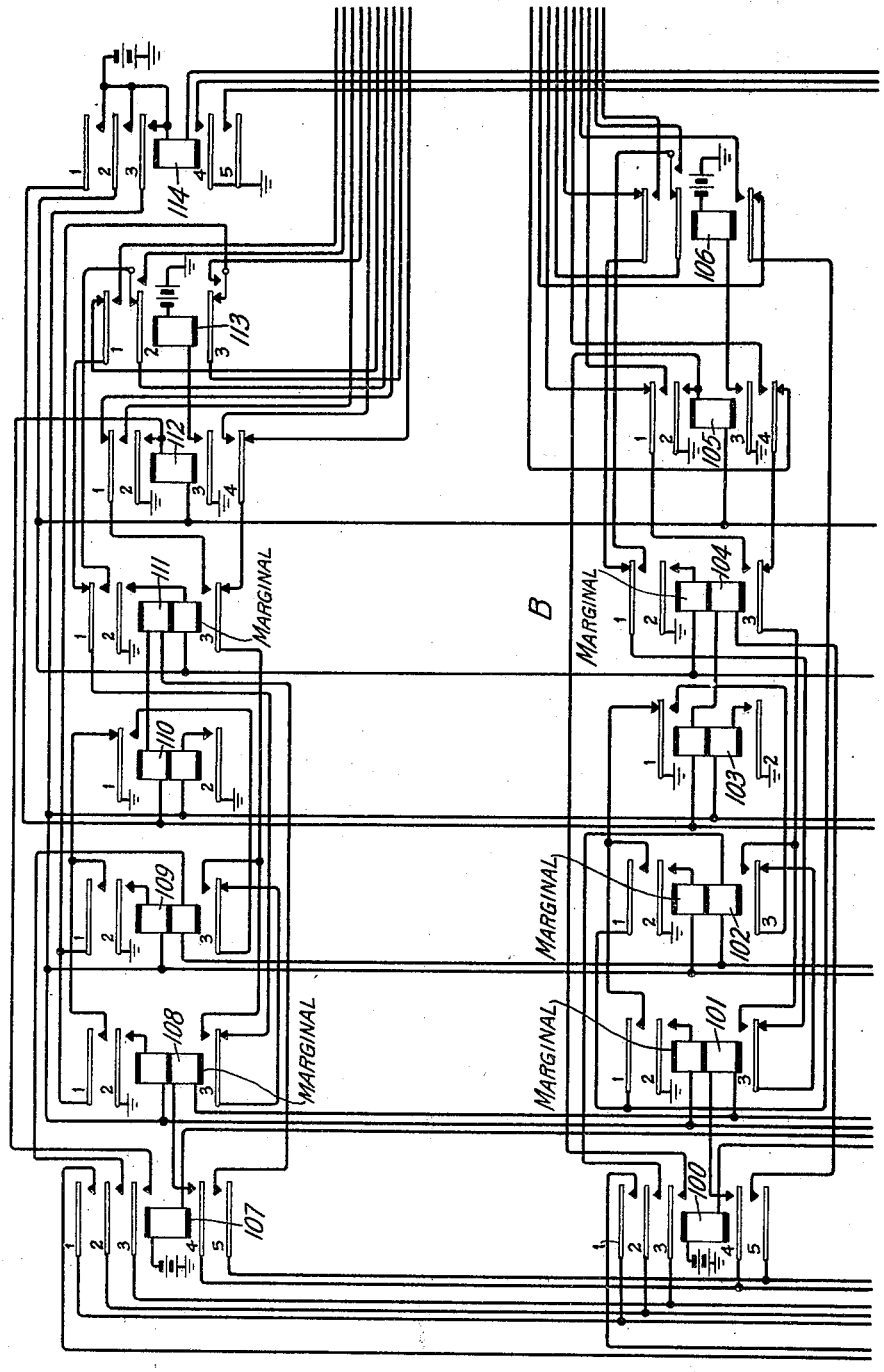

The operation of relay 100 and the advance of switch 600 prepares the testing circuit for setting the relays of register B, Fig. 1. The arrangement of relays 621, 622 and 623 is such that their operation and release continues until the register relays of the sender and testing circuit are set for 4 digits or for any number of digits, depending upon the arrangement of the testing circuit. Each operation and release of the aforesaid relays causes the operation of certain register relays in the testing circuit and sender. Therefore, the second operation of relay 621 connects ground from contact 2 of relay 512, through contact 2 of relay 513, contact 1 of relay 621, brush 603 and its associated contact in position 2, brush 615 and its associated contact in position 4, winding of relay R³ to battery. The operation of relay R³ connects ground to conductor 640 and conductor 641. A circuit is established from this ground over conductor 640, through the winding of relay 510, contact 4 of relay 100, lower winding of relay 101, brush 535, contact of relay 802, winding of relay 883, conductor 620 and thence to battery through the winding of the sender register relay 711. The ground connected to conductor 641 establishes a circuit which may be traced through contact 5 of relay 100, lower winding of relay 104, upper winding of relay 103 to battery through contact 1 of relay 114, which relays both operate in the circuit traced. This ground connected to conductor 641 may also be traced through brush 536 and its associated contact, through the windings of the sender register relays 770 and 712 to battery connected to the left contact of relay 803. Relay 103 is locked from ground through its contact 2 and lower winding to battery through contact 3 of relay 114. Relay 104 is locked from ground through contact 2 and its upper winding to battery at contact 2 of relay 114. The operation of relay 510 as traced from the circuit established over conductor 640 connects ground through its contact and contact 1 of relay 100 through the winding of relay 515 to battery. A circuit is thus established through the contact of relay 515 for the operation of relay 519 which is effective when the shunt ground through the contact of relay 510 is removed. Relay 623 is released as previously described upon the operation of relay 622. This establishes the previously described circuit for energizing motor magnet 601. The release of relay 622 after the release of relay 621 permits the brushes 602 and 603 to advance to the third terminal position.

Relay R³ is released by the release of relay 621, thus opening the circuit for relay 510 which permits the operation of relay 519. The operation of relay 519 disestablishes the energizing circuit of relay 100 and establishes an energizing circuit for relay 307 from ground at contact 5 of relay 114 through the winding of relay 307 to battery. The operation of relay 307 prepares circuit paths for the energization of the associated relays of register C.

Upon the subsequent operation of relay 621 ground is connected through its contact 1, brush 603, and associated contact in position 3, brush 614, winding of relay R⁴ to battery. The operation of relay R⁴ connects ground to conductor 641 and ground through resistance 634 to conductor 640. The conductor 640 extends through the winding of relay 510 as before, contact 4 of relay 307, lower winding of relay 308, brush 535 and associated contact, contact of relay 802, winding of relay 883, conductor 620, left winding of relay 771 to battery. Since the resistance 634 is in series with the circuit traced, and since relays 308 and 771 are marginal, only relay 510 operates. Conductor 641 extends through contact 5 of relay 307, upper windings of relays 311 and 310 to battery through contact 1 of relay 114. Conductors 641 also extends through brush 536 to the left windings of relays 703 and 772 to battery at the left contact of relay 803. Relays 310, 311, 703 and 772 are operated in the circuit traced. Relay 311 is locked from ground through its contact 2 and lower winding to battery, at contact 2 of relay 114. Relay 310 is locked from ground through its contact 2 and lower winding to battery at contact 3 of relay 114. Relay 516 is operated in a circuit from ground to the contact of relay 510, contact 1 of relay 307 to battery through the winding of relay 516. A circuit is thus established for relay 520 as described for relay 519. The operation of relay 622 and the release of relay 623 again establishes a circuit to energize magnet 601 which circuit is opened upon the release of relay 622 for advancing the brushes 602 and 603 to terminal position 4. The circuit for relay R⁴ is opened by the release of relay 621 which opens the circuit for relay 510 to cause its release. The release of relay 510 permits the operation of relay 520. The operation of relay 520 disestablishes the energizing circuit of relay 307 and establishes an energizing circuit for relay 300 through its inner contact.

In position 4 of switch 600 a circuit is established for relay R⁵ by the operation of relay 621. This circuit may be traced from ground through contacts 2 of relays 512 and 513, contact 1 of relay 621, brush 603 and its associated contact, brush 613, and its associated contact, winding of relay R⁵ to battery. The operation of relay R⁵ associates ground through resistance 634 with conductor 640 and ground through resistance 636 with conductor 641. Conductor 640 extends through winding of relay 510 as before, contact 4 of relay 300, lower winding of relay 301, brush 535, contact of relay 802, winding of relay 883, conductor 620, left winding of relay 775 to battery through the contact of relay 803. Since resistance 634 is in series with the circuit traced, and since relays 301 and 775 are marginal, only relay 510 operates. Conductor 641 is extended through contact 5 of relay 300, lower winding of relay 304, upper winding of relay 303 to battery through contact 1 of relay 114. Conductor 641 is also extended through brush 536 through the left windings of relays 773 and 774 to battery at the contact of relay 803. Since resistance 636 is in series with the relays traced in this circuit, the marginal relays 304 and 773 do not operate. Relays 303 and 774, however, operate in the circuit traced. The operation of relay 510 establishes a circuit through contact 1 of relay 300 for the operation of relay 517. A circuit is thus established for relay 521 which is effective upon the release of relay 510. Relay 510 is released upon the release of relay R⁵ which is released by the release of relay 621. The switch 600 is advanced in the manner previously described by the operation and release of relays 623 and 622. Switch 600 upon advancing to position 5 immediately establishes a circuit for advancing the brush assembly to position 6. This circuit may be traced from ground through the right outer contact of key 620, brush 602 and its associated contact, self-interrupting contact and winding of magnet 601 to battery. The switch 600 is arrested in this position, since at this time the operating circuit for relay 623 is opened by the operation of relay 513. It will be remembered that a circuit for the operation of relay 521 was established upon the release of relay 510. The operation of relay 521 establishes an obvious circuit for the operation of relay 513. The latter relay at contact 2 opens the operating circuit for relay 623 and at contact 1 opens the circuit for the operation of the register control relays R⁰ to R⁹. The operation of relay 513 takes place before the release of relay 622 which precludes any false operation of the testing apparatus.

The following is a chart showing the register relays that are operated upon the operation of any register control relay. This chart is made up to show the first set of test circuit register relays and the first set of the sender register relays, but may be used for any of the other sets of register relays.

| Control relay | Conductor | Resistance | Test circuit register relay | Sender circuit register relay |
|---|---|---|---|---|
| R¹ | 640 641 | None. 636 | 510, 108 110 | 613 625 |
| R² | 640 | None. | 510, 108 | 613 |
| R³ | 640 641 | None. None. | 510, 108 111, 110 | 613 624, 625 |
| R⁴ | 640 641 | 634 None. | 510 | None 624, 625 |
| R⁵ | 640 641 | 634 635 | 510 110 | None 625 |
| R⁶ | 641 642 | 636 None. | 110 511, 109, 112, 113 | 625 613, 646 |
| R⁷ | 642 | None. | 511, 109, 112, 113 | 613, 646 |
| R⁸ | 641 642 | 110, 111 None. None. | 110, 111 511, 109, 112, 113 | 624, 625 613, 646 |
| R⁹ | 641 642 | None. 634 | 110, 111 511, 109, 112, 113 | 624, 625 646 |
| R⁰ | 641 642 | 636 634 | 110 511, 112, 113 | 625 646 |

*Test of sender*

Following the registration of the second digit by the operation of relay R³, a circuit is established in the sender for the operation of relay 825 which circuit operation is described on page 9 of Patent 1,619,250. The operation of relay 825 removes the shunt from around the interrupter contact 823, permitting the circuit through relays 881 and 220 to be interrupted. It will be remembered that the R² relay was the first register control relay operated, thus controlling the sender to transmit two interruptions to the relay 220, causing it to release twice. Upon the first release of relay 220 a circuit is established from ground through normal contact 5 of relay 229, the normal contact of relay 220, contact 1 of relay 227, vertical off-normal contact 230, winding of relay 224 and winding of vertical magnet 222 to battery. Relay 224 and the vertical magnet are energized in the circuit traced, causing brushes 240 and 241 to be advanced to the first level of terminals in terminal bank 200. Upon the upward movement of the switch shaft and brushes the vertical off-normal contacts 231, 232 and 233 are closed. A locking circuit is thus established for relay 224 from battery through the winding of vertical magnet 222, winding and contact of relay 224, vertical off-normal contact 231, contact 1 of relay 227 to ground at the 5th normal contact of relay 229. Relay 224 is slow to release and therefore will remain operated during the time that the armature of relay 220 is attracted by the energization of relay 220 during the closed period of interrupter contact 823. Upon the second release of relay 220 a circuit is again established to energize the vertical magnet 222 from ground through the 5th normal contact of relay 229, normal contact of relay 220, contact 1 of relay 227, vertical off-normal contact 231, contact and winding of relay 224 to battery through the winding of the vertical magnet 222. The switch brushes 240 and 241 are thus advanced to the second terminal level. A shunt is again established around interrupter contact 823 and a transfer to the second set of registers is effected in the sender. When the second set of registers is associated with the pulsing circuit the shunt is again removed from the interrupter contacts 823 permitting the operation and release of relay 220 in accordance with the setting of the second sender register. Relay 220 is maintained in an operated position during this transfer and the holding circuit for relay 224 is maintained opened, thus causing the release of the latter relay.

Since relay R³ was operated for the second digit three interruptions will be permitted in the sender which will cause relay 220 to release three times. Upon the first release of relay 220, a circuit is established from ground through the normal contact 5 of relay 229, normal contact of relay 220, contact 1 of relay 227, vertical off-normal contact 231, winding of relay 225 and winding of rotary magnet 223 to battery. The brushes 240 and 241 are thus rotated to the first terminals of the second level. Upon the first rotary step of the brushes contact 221 is closed to prepare a circuit for the operation of relay 229. This circuit is however held open at the contact of relay 225, since this relay is slow to release and does not release between interruptions. The circuit arrangement for causing the second and third rotary steps for brushes 240 and 241 is the same as the first and need not be described.

Following the third interruption a transfer to the subsequent register relays takes place in the sender, permitting the release of relay 225 for establishing the operating circuit of relay 229. This operating circuit may be traced from battery through the winding of relay 229, rotary off-normal contact 221, normal contact of relay 225 to ground through contact 2 of relay 227. The operation of relay 229 extends the pulsing circuit from the sender to switch 450. This switch is the same as switch 250 and is therefore only shown diagrammatically. Relays, the same as relays 220 and 227, are immediately operated in switch 450. The relay in switchboard 450, which is the same as 227, connects ground to the winding of relay 229, previous to the release of relay 227 in switch 250. Thus, relay 229 is maintained in an operated position.

Brushes 401 and 402 are driven in a vertical and a horizontal plane in response to the impulses transmitted from the sender for the third and fourth digits. Since relay R⁴ was operated for controlling the third digit and relay R⁵ operated for controlling the fourth digit, the brushes 401 and 402 will be elevated to the fourth horizontal level and rotated to the fifth set of terminals in this level. It is thought unnecessary to describe the detailed operation of switch 450 for positioning brushes 401 and 402.

The terminals of banks 200 and 400 are strapped to form horizontal and vertical ordinates which arrangement permits a comparison of the impulses transmitted by the sender for positioning the switch with the setting of registers A, B, C and D. It will be remembered that these registers are set by the register control relays at the same time that the sender registers are set. Therefore, in response to the operation of register control relays R², R³, R⁴ and R⁵, brush 240 should be connected with the second horizontal ordinate of bank 200, brush 241 with the third vertical ordinate of bank 200, brush 401 with the fourth horizontal ordinate of bank 400 and brush 402 with the fifth vertical ordinate of bank 400.

It will be recalled that relay 108 was operated and locked in the relay register A. The 2 lamp of lamp group A should accordingly be lighted to indicate that this register was set for digit 2. The circuit for this lamp may be traced from battery through the lamp filament, normal contact 3 of relay 113, contact 1 of relay 108 to ground through normal contact 1 of relay 110. This ground is also extended to the second horizontal terminal ordinate in terminal bank 200. Since brush 240 is resting upon a terminal in this ordinate, the ground is extended over brush 240, contact 1 of relay 229 to battery through relay 211. The operation of relay 211 establishes an obvious circuit for lamp 213. The illumination of lamp 2 group A indicates that the register relay operated corresponds to the register control relay operated. Lamp 213 is lighted to indicate that the switch brushes 240 and 241 advance to the second level as directed by the sender in response to the setting of the register relays in the sender. It is apparent that if the brushes were advanced to another level the ground extended from the register A, would not operate relay 211 since this ground would not be connected to the switch brush 240.

Figure 2:
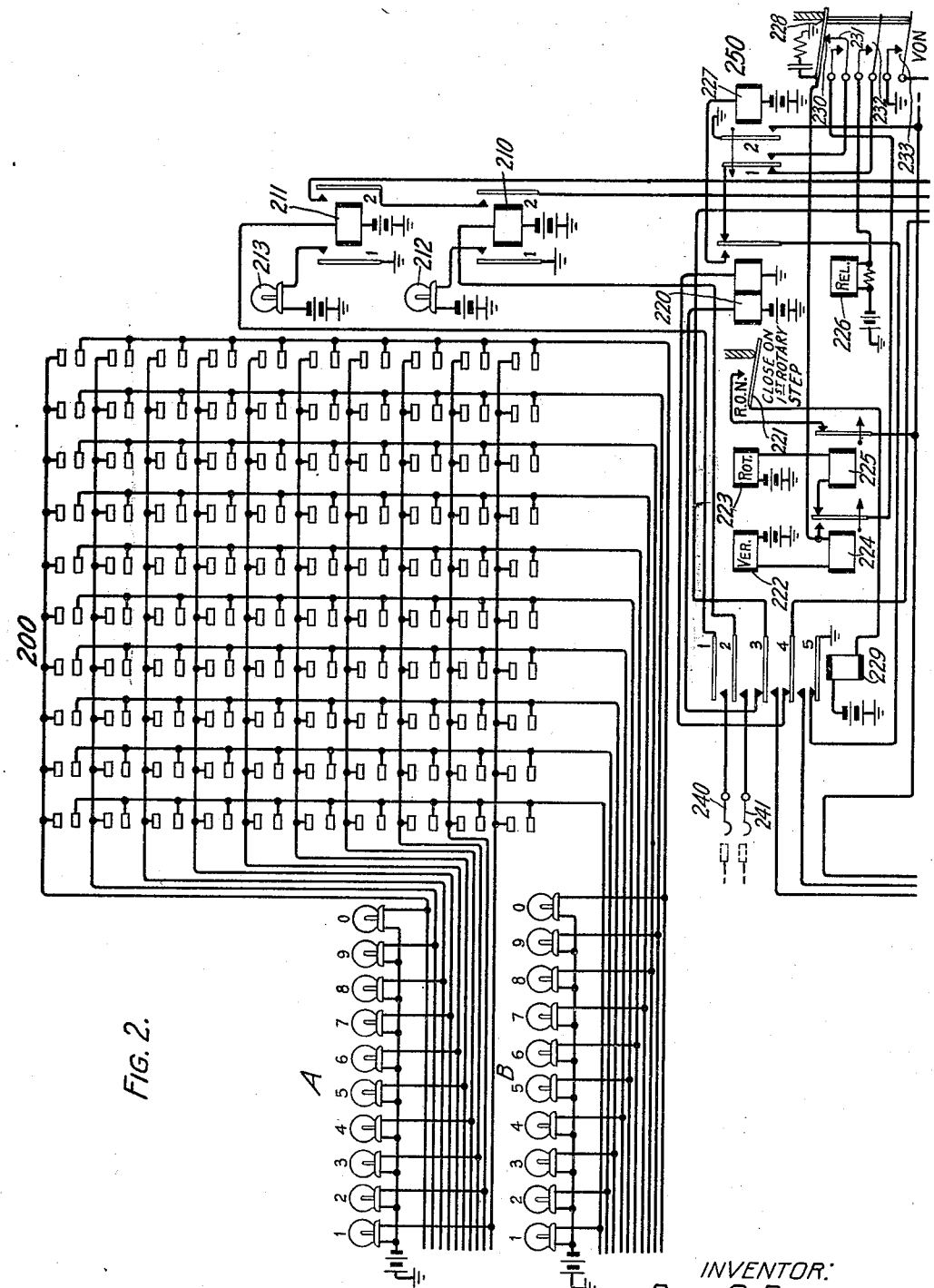
Figs. 2 and 4 show two step-by-step switches of a type well known in the art arranged to advance the brush member vertically for selecting a terminal level and horizontally for selecting a terminal of a particular level in response to impulses transmitted thereto.

In register B, Fig. 1, it will be recalled that relays 101, 103, and 104 were operated in response to the operation of register control relay $R^3$. Lamp 3 of lamp group 13 should accordingly be lighted. The circuit for this lamp may be traced from battery through its filament, normal contact 1 of relay 105, contact 3 of relay 104, contact 3 of relay 101, normal contact 3 of relay 102 to ground to contact 1 of relay 103. This ground is also extended to the third vertical terminal ordinate in bank 200. If the brushes 240 and 241 were directed by the sender in accordance with the operation of the testing circuit control relay $R^3$, brush 241 should be in contact with a terminal of the third vertical ordinate. The ground from register B, Fig. 2, is thus extended over brush 241, contact 2 of relay 229 to battery through the winding of relay 210. The operation of relay 210 establishes an obvious circuit for illuminating lamp 212.

Register relays 310 and 311 were set in the register group C in response to the operation of register control relay $R^4$. Lamp 4 in the C group will therefore be lighted. The circuit for this lamp may be traced from battery through the lamp filament, normal contact 2 of relay 213, contact 1 of relay 311, normal contact 3 of relay 308, normal contact 3 of relay 309 to ground through contact 1 of relay 310. This ground is also extended to the horizontal ordinate in the fourth level of terminals in bank 400. If brushes 401 and 402 have been properly positioned by the sender, ground is extended over brush 401 to battery through the winding of lamp 411. The operation of lamp 411 establishes an obvious circuit for lamp 413.

In the register group D relay 303 is operated in response to the operation of register control relay $R^5$. The operation of relay 303 causes lamp 5 in the D group to be illuminated. The circuit for this lamp may be traced from battery through its filament, normal contact 1 of relay 306, normal contact 1 of relay 304, normal contact 3 of relay 301, normal contact 3 of relay 302 to ground through contact 1 of relay 303. This ground is extended to the fifth vertical terminal ordinate of bank 400. If the brushes have been properly positioned by the sender, this ground will be extended to brush 402 to battery to the winding of relay 410. The operation of relay 410 establishes an obvious circuit for lamp 412.

Since the circuit disclosed herein is automatically operable, it is apparent that signals must be provided to indicate to an attendant the intended setting of the sender registers.

For this reason the lamp groups A, B, C and D are lighted in accordance with the register settings of the relay groups A, B, C and D. By observing that lamp 2 in lamp group A and lamp 213 are lighted an attendant knows that brush 240 is associated with the 2nd horizontal ordinate. If the sender registers have not been set properly in response to the operation of the testing circuit, or if the sender is in trouble from other causes, the switch brushes 240, 241, 401 and 402 will not be positioned properly upon the terminals of banks 200 and 400. When this occurs ground is not extended to the relays 210, 211, 410 or 411 depending upon the sender trouble. In the absence of a signal from lamps 212, 213, 412 or 413 an attendant may inspect the position of the switch brushes with respect to the terminal ordinates and by noting the signals lighted in lamp groups A, B, C and D analyze the trouble in the sender.

Let it be assumed that relays 210, 211, 410 and 411 have been operated by the circuits extended through contact banks 200 and 400 as previously described. A circuit is thus established for the operation of relay 512 which may be traced from battery, through its winding, contact 2 of relays 210, 211, 410 and 411 to ground. The operation of relay 512 lights lamp 522 which signal remains lighted until the testing circuit apparatus has been restored to normal. A locking circuit is established for relay 512 through its winding and contact 1 to ground through off-normal contact 233 and the off-normal contact of switch 450.

It is ordinarily desirable to advance this testing circuit automatically from one test to another. Key 651 may be operated at the same time as key 620 to cause this automatic advance. A circuit is thus established upon the completion of a test to operate relay 650 from battery through its winding, contact of key 651 to ground at contact 2 of relay 512. Since relay 650 only operates when the pulses from the sender have set all of the switch brushes in accordance with the operation of the register control relays, it is not necessary for an attendant to observe the signals lighted. In the event of a fault in the sender one or more of the relays 210, 211, 410 or 411 would remain normal and thus circuits for relays 512 and 650 would not be established.

The operation of relay 650 brings about the same result as the restoration of key 620 which is to restore the testing circuit apparatus including the switches 250 and 450 and to advance the switch 610 to a new position. The circuit for relay 114 is opened which restores this relay and all of the register relays in groups A, B, C and D and the auxiliary control relays shown in Fig. 5 that were locked in position through the contacts of relay 114. The pulsing circuit established through the contact of key 620 and relay 650 is also opened which causes the release of the switch controlling relays and permits the energization of the release magnets. The release magnet circuit for switches 250 and 450 are the same and therefore only one will be traced. This release magnet is energized from battery through its winding, vertical off-normal contact 232, normal contact 1 of relay 227, normal contact of relay 220 to ground through normal contact 5 of relay 229. When both switches 250 and 450 are restored to normal the vertical off-normal contacts are opened which opens the locking circuit for relay 512 at the vertical off-normal contact 233 and a similar contact in switch 450. At this time the lamp 522 is extinguished to indicate that the circuit has been advanced to a new test. Relay 650 is released at this time to establish circuits for this new test which is similar to the foregoing test described.

Two arrangements for advancing switch 610 have been shown. When the circuit is advanced automatically from one test to another, the operation of relay 650 establishes a circuit through its contact 3 for the energization of magnet 611. The release of relay 650 opens the circuit traced permitting the advance of brushes 612 to 616 to the next terminal position.

When key 651 is not operated for the automatic advance of the testing circuit it is necessary to restore key 620 to normal when the signals have been observed by an attendant. This restores the testing circuit apparatus to normal as previously described but does not advance switch 610 to a new testing position. Key 617 may be operated and released for the advance of this switch. The operation of key 617 connects ground through its right contact to the winding of magnet 611 and the release of key 617 permits the advance of the brushes 612 to 616. A different set of register control relays is associated with the sender registers and testing circuit registers in each position of switch 610. The control of the registers by the operation of any of the register control relays is in accordance with the chart presented herein. It will be noted that the contacts of switch 610 are connected with the control relays in such manner that practically any combination of circuit arrangements for the operation of various register relays may be established. The switch 530 may be advanced from position to position by the operation and release of key 526. Thus all of the senders in a telephone office may be associated with the testing circuit.

In the foregoing description of the testing circuit for setting the register relays in groups A, B, C and D the digits 2, 3, 4 and 5 were used. Only part of the register relay operation was thus described since it was not necessary to operate relays 109, 112 and 113 or similar relays for these numbers. In order to complete the description of the register relay operation it will be assumed that the testing circuit is set for operating register A for the digit 7. For the purpose of this description, a circuit may be assumed from ground through the normal contacts 2 of relays 512 and 513, contact 1 of relay 621, switches 600 and 610, winding of relay $R^7$ to battery. The operation of relay $R^7$ connects ground over conductor 642 through the winding of relay 511, contact 2 of relay 107, lower winding of relay 109, brush 534 and its associated contact, sender relay 884, winding of relay 613 to battery. Relay 884 operates in this circuit in order to operate relay 646 which sets both the relays 613 and 646 in the sender register, and operates relay 109 in the test circuit register A. The operation of relay 511 connects ground from its contact 1 through contact 3 of relay 107, winding of relay 112 to battery through contact 2 of relay 114. Relay 112 operates in this circuit and establishes an obvious operating circuit for relay 113. The operation of relay 511 further establishes an energizing circuit for relay 514 from ground through its contact 2, contact 1 of relay 107, winding of relay 514 to battery.

The operation of relays 109 and 113 in register A establishes a circuit for lamp 7 in lamp group A, which may be traced from battery through the lamp filament, contact 3 of relay 113, contact 1 of relay 109 to ground through normal contact 1 of relay 110. The relays 112 and 113 and similar relays in register groups B, C and D are operated merely to establish paths to the lamps 6, 7, 8, 9 and 0, and corresponding terminals in the terminal banks whenever the sender is set for any of the digits from 6 to 10. In the case just described, the sender was set for digit 7 and therefore a circuit is extended from ground through contacts of the test circuit register relays to lamp 7 and to the terminals in the seventh level of terminal bank 200. The relays in groups B, C and D are set in the same manner as that described in group A.

What is claimed is:

1. In a signaling system, a switch having brushes each movable in a plurality of different directions and terminals arranged in primary and secondary ordinates, signaling apparatus for said primary and secondary ordinates, means for directing said brushes to particular terminals, and means responsive to the positioning of said brushes to operate said signaling apparatus in accordance with the primary and secondary ordinate locations of said brushes.

2. In a signaling system, a switch having brushes each movable in a plurality of different directions and terminals arranged in primary and secondary ordinates, signaling apparatus for said primary and secondary ordinates, means for directing said brushes to particular terminals, and means responsive to the positioning of said brushes to operate said signaling apparatus in accordance with the primary and secondary ordinate locations of said brushes to indicate the position taken by said brushes.

3. In a signaling system, a switch having brushes each movable in a plurality of different directions and terminals strapped together in primary and secondary ordinates, means for directing said brushes to particular terminals, signaling apparatus, and means responsive to the positioning of said brushes to operate said signaling apparatus in accordance with the primary and secondary ordinate locations of said brushes.

4. In a signaling system, a switch having a brush set capable of motion in a plurality of different directions, and terminals arranged in primary and secondary ordinates, signaling apparatus for said primary and secondary ordinates, means for directing said brush set to particular terminals, and means responsive to the position of said brush set to operate signaling apparatus in accordance with the primary terminal ordinate as associated with one brush of said set and the secondary terminal ordinate as associated with another brush of said set.

5. In a system for testing an impulse producing device, means for variably controlling said device to produce a series of impulses, a switch having movable brushes and a plurality of stationary terminals arranged in primary and secondary ordinates, means responsive to impulses produced for associating said brushes with any combination of said ordinates, signals for indicating the ordinates associated with said brushes and means responsive to the association of said brushes with terminals of said ordinates for operating said signals.

6. In a system for testing an impulse producing device, means for variably controlling said device to produce series of impulses, a plurality of switches, each having a pair of brushes movable in the same directions and a plurality of stationary terminals arranged in primary and secondary ordinates, means responsive to impulses produced for associating each brush of said pair with a different ordinate, signals for each switch for indicating the ordinate associated with each brush, and means for operating said signals in response to said association.

7. In a system for testing an impulse producing device, means for variably controlling said device to produce series of impulses, a switch having movable brushes and a plurality of stationary terminals arranged in primary and secondary ordinates, means operable in response to the operation of said controlling means for electrically characterizing certain primary and secondary ordinates, means responsive to impulses produced for associating said brushes with said characterized ordinates, signals for indicating the association of said brushes with said characterized ordinates, and means for operating said signals.

8. In a system for testing an impulse producing device, means operable for variably controlling said device to produce series of impulses, a switch having movable brushes and a plurality of stationary terminals arranged in primary and secondary ordinates, means responsive to impulses produced for associating said brushes with combinations of said ordinates, signals for indicating the setting of said device, means responsive to the operation of said control means for electrically characterizing certain ordinates and operating certain of said signals, other signals for indicating the position taken by said brushes in response to said impulses, and means to operate said other signals.

9. In a signaling system, a switch having two movable brushes and stationary terminals arranged in levels, each level having two rows of terminals for engagement with said brushes, the terminals of said rows being strapped together to form a plurality of horizontal and vertical ordinates, means to electrically characterize a horizontal and a vertical ordinate, means to transmit impulses for directing said brushes to said characterized ordinates, signals for each of said ordinates, and means to operate said signals only by the association of said brushes with said characterized ordinates.

10. In a signaling system, an impulse producing device, means for producing impulses for a series of digits, a switch having movable brushes and a bank of stationary terminals, said terminals being arranged in primary and secondary ordinates, means to electrically characterize a certain primary and a certain secondary ordinate, means responsive to impulses produced for a plurality of digits for associating said brushes with said characterized ordinates, and signaling means for indicating when said brushes register with said characterized ordinates.

11. In a signaling system, a switch having movable brushes and stationary terminals, said terminals being arranged in a plurality of levels, each level having a plurality of rows of terminals for engaging said brushes, said terminals being strapped together in a manner to form horizontal and vertical ordinates, means to transmit impulses to step all of said brushes in horizontal and vertical directions, signaling means for each directional group of ordinates, and means to operate said signals in response to the arrival of said brushes upon certain terminals of said ordinates.

12. In a system for testing a switch positioning device, means automatically operable for variably controlling said switch positioning device for producing impulses for a series of digits to position switches in a particular manner, a switch having movable brushes and a bank of stationary terminals, said terminals being connected in horizontal and vertical ordinates, means to characterize a certain horizontal and a certain vertical ordinate by connection of electrical circuits thereto in response to said control means, means responsive to the impulses produced for two digits to position said brushes and signaling means energized by the association of said brushes with said characterized ordinates to indicate that the impulses for each digit are produced by said device in accordance with the operation of said control means.

13. In a system for testing senders, a plurality of switches having movable brushes and stationary terminals, said terminals being arranged in primary and secondary ordinates, a plurality of registers, a plurality of control relays automatically operable for setting a sender for producing impulses for a series of digits to position said brushes on particular terminal ordinates and for setting said plurality of registers, signals operated in response to said register settings for indicating the terminal ordinates to which said brushes have been directed and signals to indicate the particular terminal ordinates on which said brushes have been positioned by the impulses produced by said sender.

14. In a telephone system, a plurality of registers for controlling the transmission of impulses, a group of electro-magnetic devices for establishing circuits for operating said registers, each device of said group being operable to set a register in a particular manner, and an automatically operable switching mechanism for variably operating the devices of said group for variably setting said plurality of registers.

15. In a telephone system, a plurality of registers for controlling the transmission of impulses, a plurality of electromagnetic devices for establishing circuits for operating said registers, each device of said group being operable to set a register for the transmission of impulses for a particular digit, variably adjustable switching apparatus for controlling the devices of said group, and a switch for consecutively establishing operating circuits for said devices in accordance with the adjustment of said switching apparatus.

16. In a telephone system, a plurality of registers for controlling the transmission of impulses, a plurality of electromagnetic devices for establishing circuits for operating said registers, each device of said group being operable to set a register for the transmission of impulses for a particular digit, variably adjustable switching apparatus for controlling the devices of said group, a switch for consecutively establishing operating circuits for said devices in accordance with the adjustment of said switching apparatus, and means for progressively operating said switch in response to the setting of each register.

17. In a telephone system, switches, a plurality of registers for controlling the transmission of impulses for positioning said switches, a group of electromagnetic devices for establishing circuits for operating said registers, each device of said group being operable to set a register in a particular manner, an automatically operable switching mechanism for variably operating the devices of said group for variably setting said plurality of registers, and means to variably position said switches in accordance with the setting of said registers.

18. In a telephone system, switches, a plurality of registers for controlling the transmission of impulses for positioning said switches, a group of electromagnetic devices for establishing circuits for operating said registers, each device of said group being operable to set a register in a particular manner, an automatically operable switching mechanism for variably operating the devices of said group for variably setting said plurality of registers, means to variably position said switches in accordance with the setting of said registers, signals and means to operate said signals for indicating the position taken by said switches.

19. In a telephone system, a plurality of relay registers for controlling the transmission of impulses comprising marginal and non-marginal relays, resistances, a group of relays for establishing circuits including or excluding said resistances for variably operating the relays of said registers, each relay of said group being operable to operate certain relays of a register, an automatically operable switching means for variably operating the relays of said group for variably operating the relays of said registers, and signals for indicating the impulses transmitted.

In witness whereof, I hereunto subscribe my name this 29th day of June, 1928.

BERT G. DUNHAM.